(12) United States Patent
Rudrapatna et al.

(10) Patent No.: US 7,703,289 B2
(45) Date of Patent: Apr. 27, 2010

(54) INTERNAL FUEL MANIFOLD HAVING TEMPERATURE REDUCTION FEATURE

(75) Inventors: Nagaraja Rudrapatna, Mississauga (CA); Oleg Morenko, Oakville (CA); Bhawan B. Patel, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 828 days.

(21) Appl. No.: 11/532,611

(22) Filed: Sep. 18, 2006

(65) Prior Publication Data

US 2010/0077758 A1    Apr. 1, 2010

(51) Int. Cl.
F02C 7/22    (2006.01)
F02C 7/228    (2006.01)
(52) U.S. Cl. .............................. 60/772; 60/725; 60/739
(58) Field of Classification Search .................... 60/739, 60/725, 772
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 3,093,317 A * | 6/1963 | O'Sickey et al. | 239/453 |
| 3,102,392 A * | 9/1963 | Bauger et al. | 60/739 |
| 3,213,523 A | 10/1965 | Boehler | |
| 3,472,025 A | 10/1969 | Simmons et al. | |
| 4,086,760 A * | 5/1978 | Chute | 60/39.83 |
| 4,100,733 A | 7/1978 | Striebel et al. | |
| 4,322,945 A | 4/1982 | Peterson et al. | |
| 4,327,547 A | 5/1982 | Hughes et al. | |
| 4,404,806 A | 9/1983 | Bell, III et al. | |
| 4,483,137 A | 11/1984 | Faulkner | |
| 5,036,657 A | 8/1991 | Seto et al. | |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |

(Continued)

FOREIGN PATENT DOCUMENTS

CA    1013153    7/1977

(Continued)

OTHER PUBLICATIONS

International Search Report of PCT/CA2007/001650.

*Primary Examiner*—Ted Kim
(74) *Attorney, Agent, or Firm*—Ogilvy Renault LLP

(57) ABSTRACT

A fuel manifold assembly for a gas turbine engine comprises an annular fuel manifold and a plurality of fuel nozzles circumferentially distributed about the fuel manifold. The fuel manifold has at least one fuel conveying passage in fluid flow communication with the plurality of fuel nozzles and defines at least one location susceptible to overheating between two of the plurality of fuel nozzles. A slot extends through the fuel manifold in the susceptible location to reduce heat transfer in the fuel manifold while maintaining the fuel manifold assembly dynamically balanced.

22 Claims, 4 Drawing Sheets

U.S. PATENT DOCUMENTS

| | | |
|---|---|---|
| 5,848,525 A | 12/1998 | Spencer |
| 5,956,955 A | 9/1999 | Schmid |
| 5,983,642 A | 11/1999 | Parker et al. |
| 5,996,335 A | 12/1999 | Ebel |
| 6,109,038 A | 8/2000 | Sharifi et al. |
| 6,141,968 A | 11/2000 | Gates et al. |
| 6,149,075 A | 11/2000 | Moertle et al. |
| 6,240,732 B1 | 6/2001 | Allan |
| 6,256,995 B1 | 7/2001 | Sampath et al. |
| 6,463,739 B1 | 10/2002 | Mueller et al. |
| 6,474,070 B1 | 11/2002 | Danis et al. |
| 6,761,035 B1 | 7/2004 | Mueller |
| 7,325,402 B2 * | 2/2008 | Parker et al. .................. 60/740 |
| 2003/0014979 A1 | 1/2003 | Summerfield et al. |
| 2005/0188699 A1 * | 9/2005 | Shafique et al. ............... 60/739 |

FOREIGN PATENT DOCUMENTS

| | | |
|---|---|---|
| CA | 2307186 | 5/1999 |
| CA | 2333936 | 5/1999 |
| CA | 2557440 | 2/2005 |
| EP | 0660038 | 6/1995 |
| EP | 0939275 | 9/1999 |
| GB | 2404976 | 2/2005 |
| WO | WO 9504244 | 2/1995 |

* cited by examiner

US 7,703,289 B2

INTERNAL FUEL MANIFOLD HAVING TEMPERATURE REDUCTION FEATURE

TECHNICAL FIELD

The invention relates generally to a gas turbine engine and, more particularly to gas turbine engine fuel manifolds and methods of manufacturing same.

BACKGROUND OF THE ART

A fuel carrying member such as an internal manifold of a gas turbine engine must survive inside a hot environment while protecting the fuel flowing therein from being subjected to high temperatures. To accomplish this, a heat shield is used around the internal manifold to minimize convective heat transfer thereto. The heat shield is exposed to much higher temperatures than the internal manifold and acts to insulate the latter. As heat transfer still occurs to a certain degree, the internal manifold further relies on high velocity fuel flow to act like a heat sink to reduce the temperature of the metal.

Thus, fuel coking under steady state conditions becomes a major concern as the fuel flow experiences a temperature rise while traveling through the internal manifold. Furthermore, the fuel is gradually depleted as it travels from the inlet through the internal manifold feeding each nozzle in its path. As the volume and the velocity of the fuel decreases, the heat input into the internal manifold becomes more problematic. This is particularly true at the point furthest away the inlet of the internal manifold where there is generally no fuel flow but a constant heat input. Without or with very little fuel flow to act as a heat sink, the internal manifold may heat in these susceptible areas to temperatures above fuel-coking threshold levels. Therefore, there is a need to reduce the temperature of the internal manifold at locations susceptible to overheating so as to mitigate the risk of fuel coking.

Accordingly, improvement in the internal manifold assembly design is sought.

SUMMARY OF THE INVENTION

It is therefore an object of this invention to provide an improved internal manifold assembly design.

In one aspect, the present invention provides a fuel manifold assembly for a gas turbine engine comprising an annular fuel manifold and a plurality of fuel nozzles circumferentially distributed about the fuel manifold, the fuel manifold having at least one fuel conveying passage in fluid flow communication with the plurality of fuel nozzles and defining at least one location susceptible to overheating between two of the plurality of fuel nozzles, and wherein a slot extends through the fuel manifold within the susceptible location to reduce heat transfer in the fuel manifold while maintaining the fuel manifold assembly dynamically balanced.

In a second aspect, the present invention provides a fuel injection system for gas turbine engine including a compressor, a combustor and a turbine, comprising: an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold defining at least one location susceptible to overheating between two of the plurality of fuel nozzle; an annular heat shield at least partially covering the fuel manifold about the circumference thereof; and at least one slot extending through the fuel manifold in the susceptible location to reduce heat transfer in the fuel manifold while maintaining the fuel manifold assembly dynamically balanced.

In a third aspect, the present invention provides a method of reducing heat transfer in an internal fuel manifold of a fuel injection system in a gas turbine, the method comprising the steps of: determining at least one location of the internal fuel manifold susceptible to overheating during engine operation; forming at least one slot within the susceptible location; and ensuring that the fuel injection system remains dynamically balanced with said slot formed in the susceptible location of the internal fuel manifold.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
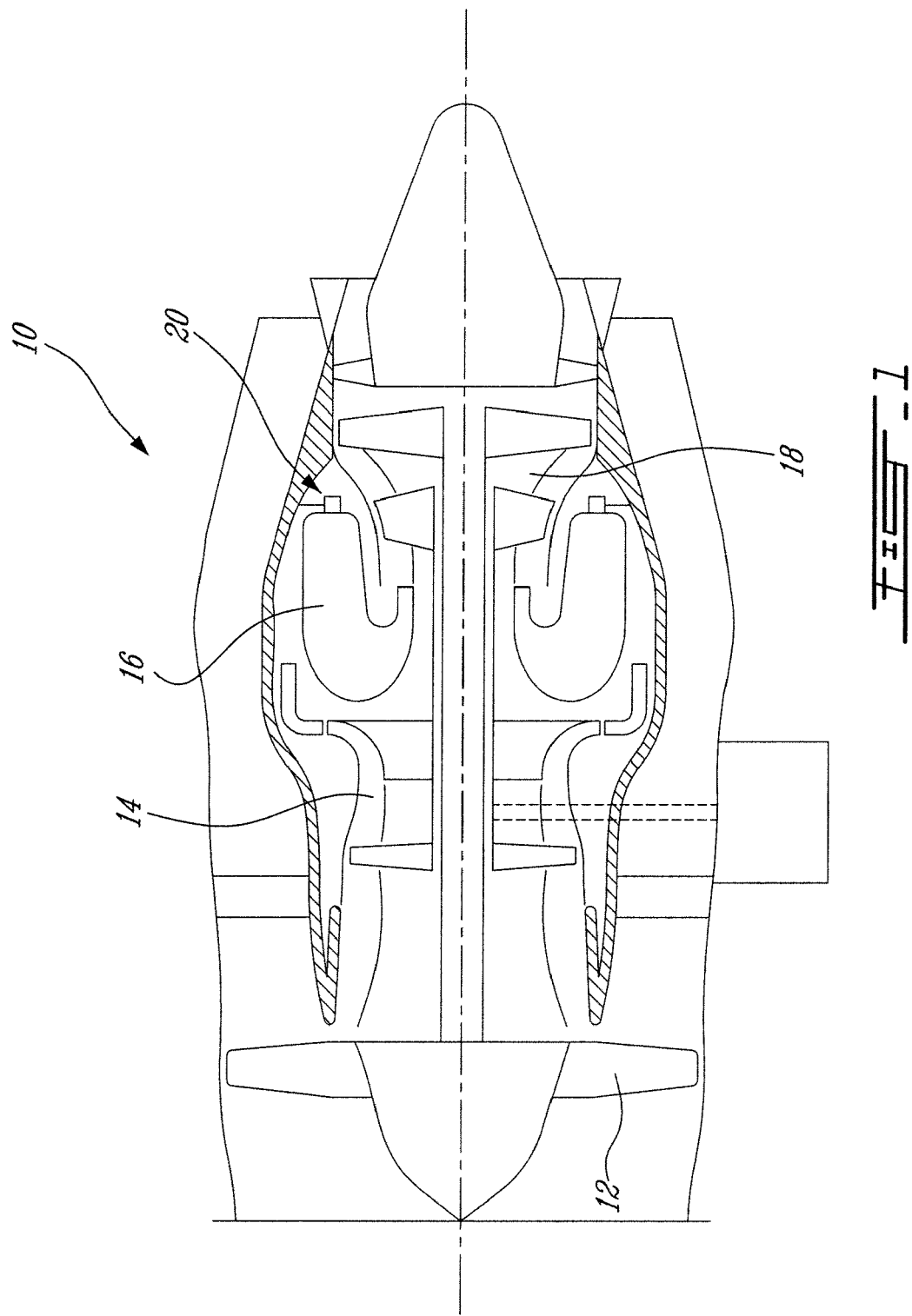
FIG. 1 is a schematic cross-sectional view of a gas turbine engine.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized, the mixture being subsequently ignited for generating hot combustion gases before passing through a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture.

Figure 2:
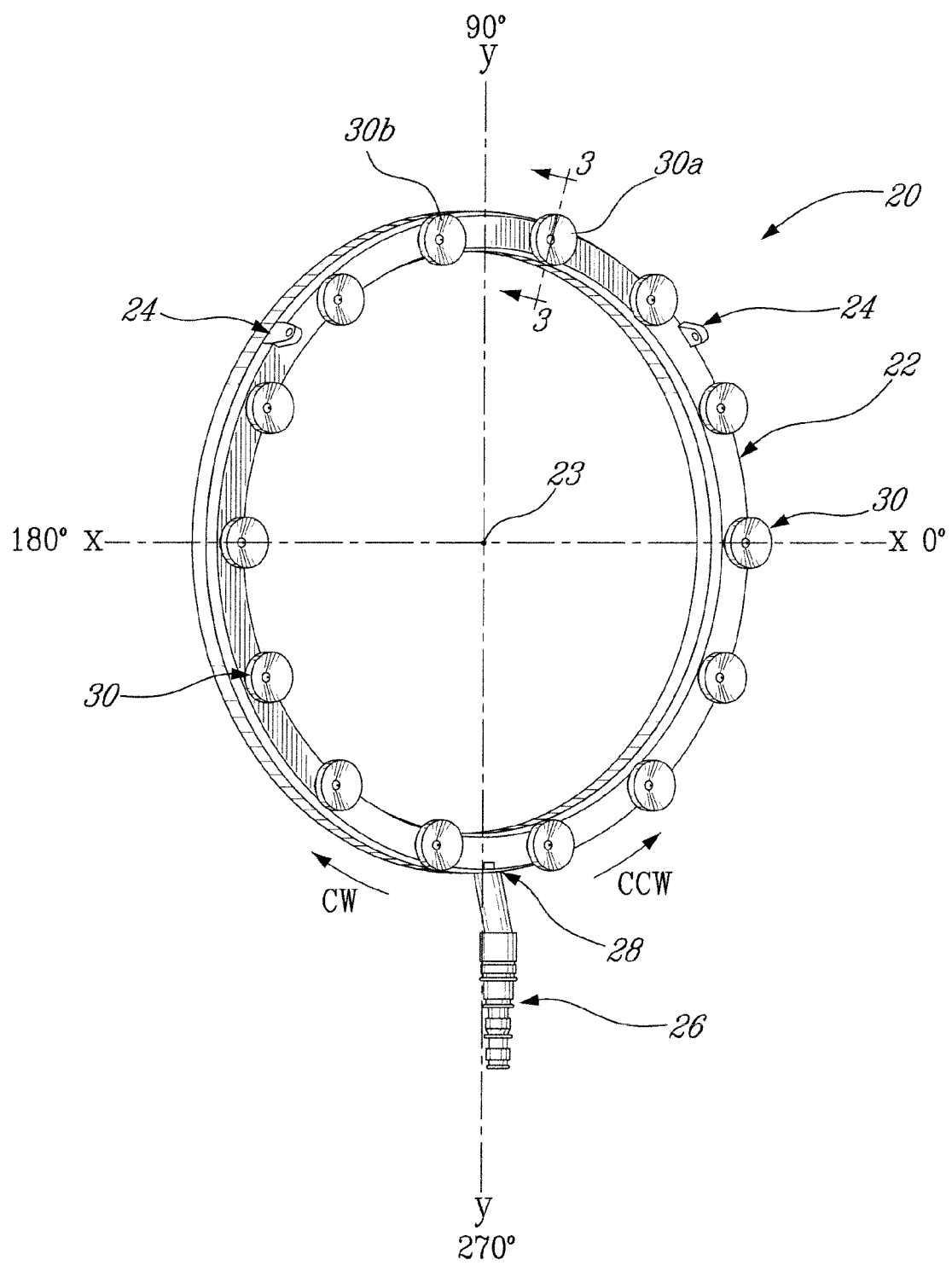
FIG. 2 is a front view of an internal fuel manifold assembly in accordance with one aspect of the present invention, for use in a gas turbine engine such as that shown in FIG. 1.
Figure 3:
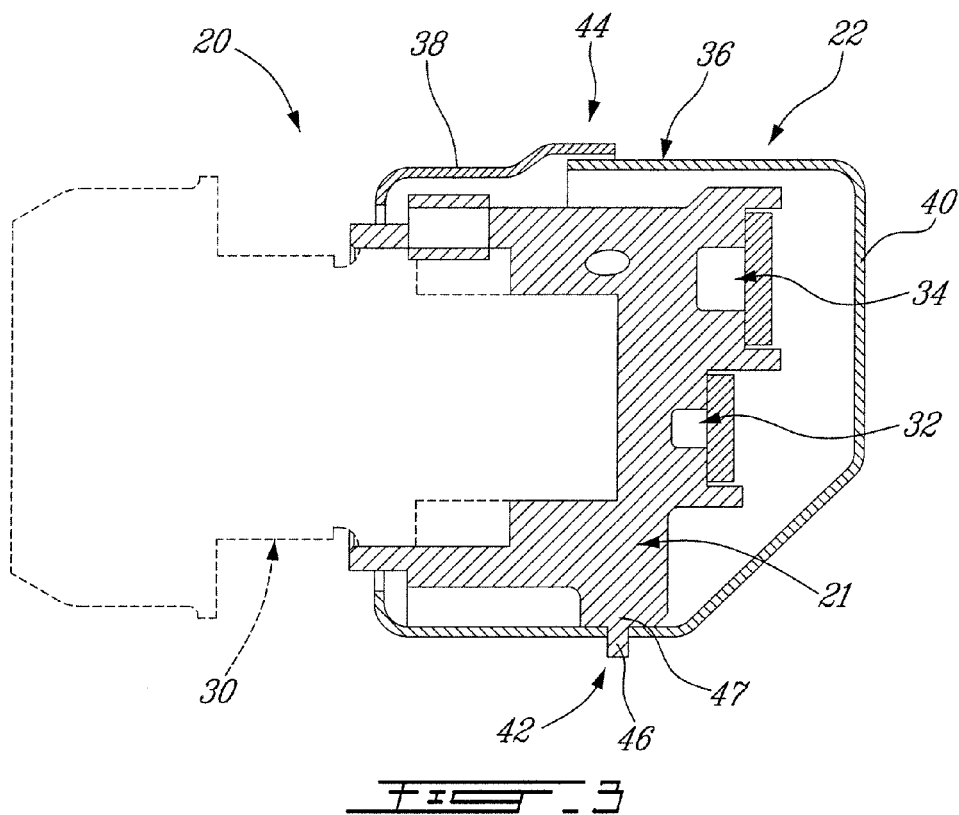
FIG. 3 is a perspective cross-sectional view of the internal fuel manifold assembly of FIG. 2, taken through line 3-3 thereof.

Referring to FIGS. 2 and 3, the fuel injection system 20 comprises at least one fuel conveying member through which fuel flows. In the exemplary embodiment, the fuel injection system 20 includes an annular internal manifold assembly 22 having a ring shape which is mounted adjacent to the combustor 16 in the gas turbine engine 10. The internal manifold assembly 22 is preferably mounted to the combustor 16 or to surrounding support structure via several integral attachment lugs 24 which receive pins (not shown) engaged to the support structure. This provides a mounting mechanism which allows for thermal expansion of the internal manifold at high temperatures.

The fuel manifold assembly 22 includes a solid fuel manifold ring 21 defining at least one fuel flow passage therein which is in fluid flow communication with a plurality of fuel nozzles 30 mounted to the fuel manifold 21. A fuel inlet pipe 26 provides fuel to the internal manifold assembly 22, via inlet 28, which then distributes the fuel supply to nozzles 30. The nozzles 30 can be directly mounted to the fuel manifold ring 21. In this particular embodiment, primary and secondary annular fuel conduits 32 and 34 (FIG. 3) permit circumferential distribution of a primary and secondary fuel supply provided through the inlet pipe 26 around the fuel manifold ring 21. The primary and secondary fuel supplies both split in two upon entering the fuel manifold ring 21 through the fuel inlet 26 and each flow in both a clockwise direction, identified by "CW" in FIG. 2, and in a counter clockwise direction, identified by "CCW" in FIG. 2, away from the fuel inlet disposed at the lowest point of the ring.

Still referring to FIG. 2, a Cartesian coordinate system having x and y axes intersecting each other at a center point 23 which is coincident with a center of the fuel manifold ring 21 is illustrated. As the center of the Cartesian coordinate system is concentric with the center 23 of the fuel manifold ring 21, the x-axis extends along a horizontal midplane of the ring 21 and the y-axis extends along a vertical midplane of the ring 21. The Cartesian coordinate system defines a 360 degree coordinate plane wherein the positive x-axis defines 0 degree position in the plane and the positive y-axis defines the 90 degree position in the plane. The fuel inlet pipe 26 is located at 270 degrees in the Cartesian plane such that the fuel flows upwards through fuel conduits 32 and 34, in the CW and CCW directions as described above, from the bottom-most 270 degree position to the last fuel nozzles 30a and 30b located proximate the top-most 90 degree position on the circumference of the fuel manifold ring 21. The fuel conduits 32 and 34 typically end just after the last fuel nozzles 30a and 30b (i.e. between the location of these fuel nozzles and the top-dead-center or 90 degree point on the manifold ring).

Notably, fuel flow is fastest at the inlet 28 and slowest proximal the last nozzles 30a and 30b near the top of the ring 21 defined at the 90 degree position in the Cartesian plane. As the fuel flows circumferentially, feeding each nozzle 30 in its path, it decreases and/or slows down until all the fuel exits the last nozzles 30a and 30b. Thus, at the last nozzles 30a and 30b, the fuel flow is weaker and/or slower than at the opposite end (i.e. the inlet) of the ring 21.

Referring concurrently to FIGS. 2 and 3, the internal manifold assembly 22 comprises an outer heat shield 36 which at least partially covers the fuel manifold ring 21 therein. Preferably, the heat shield 36 covers almost the entire inner fuel manifold 21, such as to protect it from the high temperatures of the combustor and the area surrounding the combustor in the engine.

Referring now to FIG. 3 in more detail, the outer heat shield 36 of the fuel manifold assembly 22 is provided as a two-part shield, having a front segment 38 and a rear segment 40 for enclosing the internal manifold 22 as clearly shown in FIG. 3. The front and rear segments 38 and 40 meet each other and/or the mounting point on the fuel manifold ring 21 about an inner and outer diameter 42 and 44 thereof. However, in an alternate embodiment the heat shield 36 may be in fact composed of a single component, provide installation thereof onto the fuel manifold 21 remains possible. In the embodiment depicted in which the two-part heat shield is used, the fuel manifold ring 21 is provided with an inner circumferential lip 46 protruding radially inwardly from a circumferential surface 47 on the inner diameter 42 of the fuel manifold ring 21. The circumferential lip 46 provides a mounting point to which the front and rear heat shield segments 38 and 40 are fastened, by way of suitable method such as brazing or welding for example. As the contact between the heat shield 36 and the fuel manifold 21 is limited generally to the lip 46, the conductive heat transfer therebetween is accordingly limited. Further, as the interconnection between the heat shield and fuel manifold is limited to a relative confined area, simpler manufacturing of the assembly is possible (i.e. the welds or braze used to fasten the heat shield to the manifold are confined to a limited and relatively accessible region of the assembly).

FIG. 3 shows the front and rear heat shield segments 38 and 40 in abutting relation with the lip 46 about the inner diameter 42 of the internal manifold 22. The front and rear heat shield segments 38 and 40 overlap along the outer diameter 44 of the ring 21. Thus, the front and rear heat shield segments 38 and 40 are attached to the manifold ring 21 along the inner diameter 42 and are free to move relative to each other along the outer diameter 44 thereof. During engine operation, the front and rear segments 38 and 40 are subjected primarily to a tensile force at the outer diameter 44 of the ring thereby pulling away from each other. The opposite is the case along the inner diameter 42 of the ring 21 where the segments 38, 40 are subjected to a compression force.

Furthermore, the heat shield 36 is exposed to higher temperatures than the fuel manifold ring 21 of the internal manifold assembly 22. For example, in one exemplary embodiment, the heat shield 36 can be exposed to temperatures ranging between 700 to 800 degrees F., while the manifold ring 21 can be exposed to temperatures ranging between 300 to 400 degrees F. The location of greatest heat transfer from the heat shield 22 to the manifold ring 21 occurs through the joints therebetween. Thus, it is desirable to minimize the support required for heat shield attachment while maintaining the system dynamically balanced.

The heat shield 36 is joined to the manifold ring 21 by joints (not shown). Particularly, the joints are intermittently disposed about the circumference of the ring 21, and more specifically on the lip 46 along the inner diameter 42. For example the joints may be provided as intermittent weld connections placed in predetermined locations on the manifold ring 21. The joint configuration considers both the heat transfer which occurs through the joints and the dynamics of the manifold assembly 22 in response to the location of the joints. The joint configuration is optimized so as to provide the minimum support required for the heat shield 36 to remain attached to the manifold ring 21 while maintaining the assembly 22 dynamically balanced during engine operation. By minimizing the joint connections, the heat input to the ring 21 is also minimized.

Nevertheless, heat transfer does occur from the heat shield 36 to the manifold ring 21 to a certain degree throughout the entire internal manifold assembly 22. Thus, the internal manifold further relies on the fuel flow traveling in the primary and secondary fuel conduits 32 and 34 to act like a heat sink to reduce the temperature of the manifold ring 21 that is generally made of metal. A high volume of fuel at high velocity can effectively absorb heat input from the external environment transferred to the manifold ring 21. However, as the fuel is gradually depleted from feeding each nozzle 30 in its path thereby reducing the volume and/or the velocity thereof, the fuel's capability to absorb heat is also reduced. Thus, at locations of slow or no fuel flow, such as at the furthest point from the inlet 28, heat input to the manifold ring 21 is problematic. It is critical that the metal temperature in the fuel conduits 32 and 34 is maintained below the fuel coking threshold levels in these locations of slow fuel flow.

Figure 4:
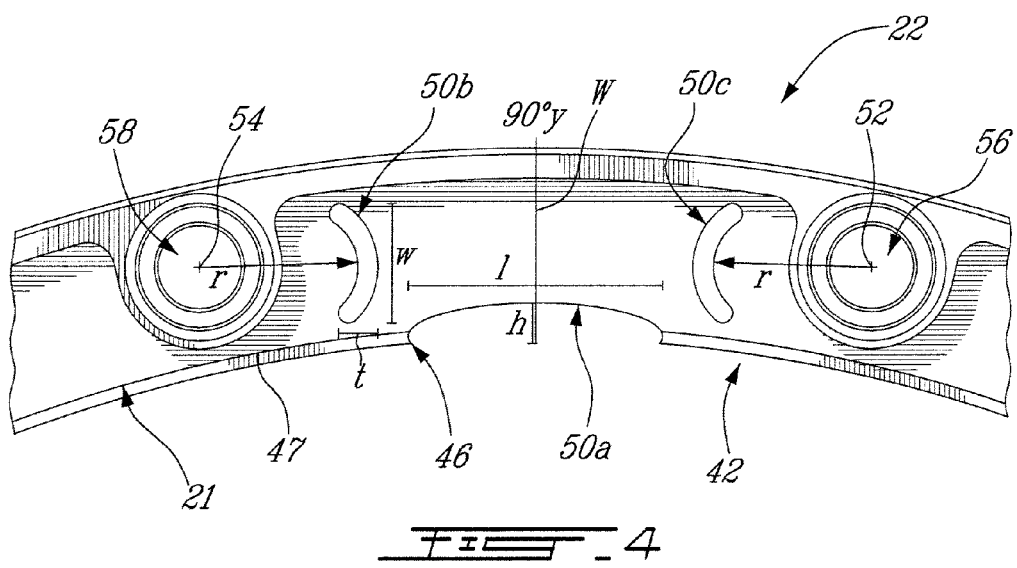
FIG. 4 is an enlarged front view of a portion of the internal fuel manifold assembly of FIG. 2, showing features for temperature reduction in accordance with a particular embodiment of the present invention.

Now referring to FIG. 4, a particular embodiment of the internal fuel manifold assembly 22 comprising features for temperature reduction is shown. The features are provided as slots 50a, 50b, 50c disposed in locations susceptible to overheating. In the present exemplary embodiment, the slots 50a, 50b, 50c are disposed at a location furthest away from the inlet 28, and more specifically between the last nozzles 30a, 30b of the assembly 22. At this particular location there is no fuel flow and therefore the slots 50a, 50b, 50c help reduce convective heat transfer through the manifold ring 21. The slots 50a, 50b, 50c extend through the manifold ring 21.

Figure 5:
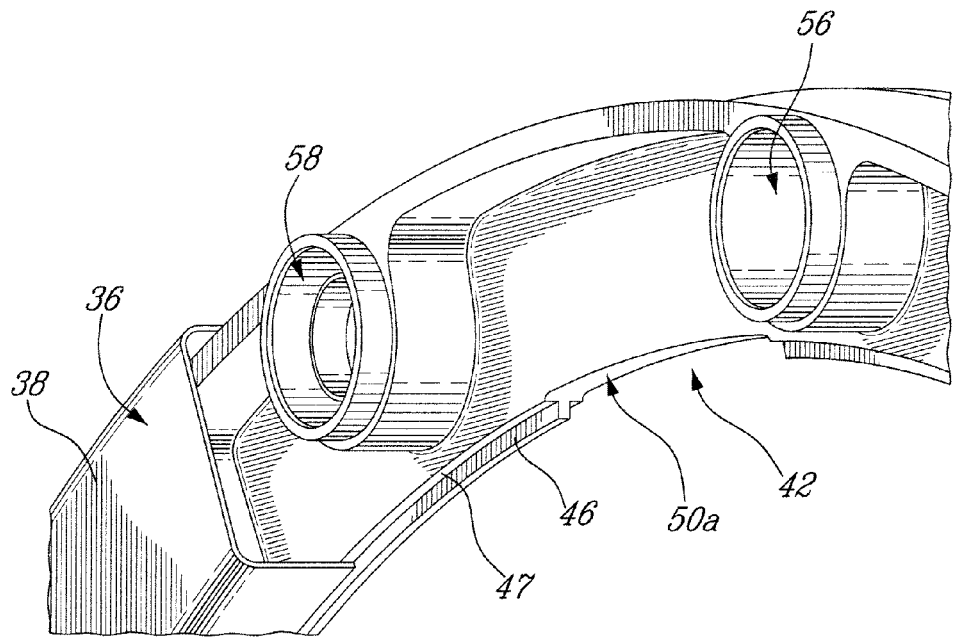
FIG. 5 is an enlarged perspective view of a portion of the internal fuel manifold assembly of FIG. 2, showing one of the features for temperature reduction of FIG. 4 in accordance with a particular embodiment of the present invention.

Now referring concurrently to FIGS. 4 and 5, slot 50a is shown as a curved cut-out of a portion of the lip 46 located at 90 degrees on the manifold ring 21. The slot 50a extends into the manifold ring 21 just past the lip 46 into the circumferential surface 47 such that the highest point on the curve is preferably located on the vertical y-axis. Thus, by creating a symmetric slot 50a about the y-axis the assembly 22 is maintained dynamically balanced. A person skilled in the art will recognize that the length l and height h of the slot 50a can vary depending on the dynamics of a particular internal manifold assembly.

The slot 50a is machined at a location without a joint connecting the heat shield 36 to the manifold ring 21. At the location of the slot 50a, the front and rear heat shield segments 38 and 40 are not separated by the lip 46; thus, during engine operation the segments 38, 40 which are subjected to a compression force along the inner diameter 42 tend to move together. The segments 38, 40 further enclose the manifold ring 21 and thereby reduce the exposed manifold ring surface to hot air which in turn minimizes the heat input at this location.

Now referring to FIG. 4, slots 50b and 50c are shown as a pair of concentric crescent shaped cut-outs in the manifold ring 21 symmetrically located as mirror images of each other with respect to the vertical y-axis. The slots 50b, 50c have a width w, a thickness t and a radius of curvature r. In this exemplary embodiment the width w of the slots 50b, 50c is approximately 60% of the width W of the manifold ring 21 and has a thickness t of about 0.100 inches. The radius of curvature r is measure from center points 52 and 54 of the fuel nozzle receiving ports 56 and 58 respectively, the nozzle receiving ports 56 and 58 being adapted for receiving the last fuel nozzles 30a and 30b respectively. Thus, the slots 50b, 50c have a smooth curvature that follows the curvature of the fuel nozzle receiving ports 56 and 58 so as to minimize stress concentrations. Also, the slots 50b, 50c preferably extend within the limits of the inner 42 and outer diameter 44 of the manifold ring 21 defining the width W of the manifold ring 21, and defining a closed perimeter slot disposed between the inner and outer diameters of the manifold ring. The slots help to optimally limit the heat conduction that naturally occurs from the point of greatest temperature, which is at 90 degrees, moving in a circumferential direction towards the fuel nozzles receiving ports 56 and 58. It is also advantageous for the slots 50b, 50c to have a crescent shape for machining purposes; however, a person skilled in the art will understand that the slots may have any other geometric shape that falls within the scope of the present invention.

Figure 6:
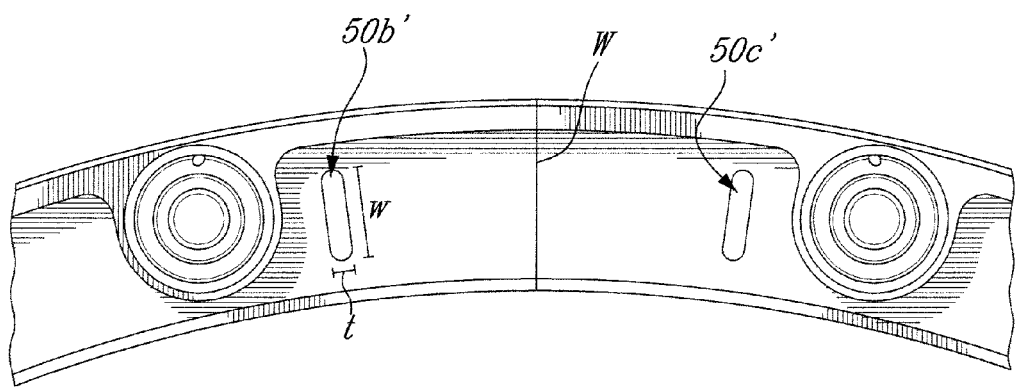
FIG. 6 is an enlarged front view of a portion of the internal fuel manifold assembly of FIG. 2, showing a pair of feature for temperature reduction in accordance with another particular embodiment of the present invention.

Now referring to FIG. 6, another particular embodiment of the slots is shown, the slots are identified as 50b' and 50c'. In this particular embodiment the slots 50b' and 50c' have an elongated shape with about the same dimensions as slots 50b, 50c shown in FIG. 4.

Thus, it can be seen that the slots 50a, 50b, 50c help reduce the temperature in the manifold ring 21 at a location susceptible to overheating by providing a greater conduction resistance and/or by reducing the manifold ring exposure to hot air. As a result the manifold durability is significantly enhanced and fuel coking concerns are addressed. Furthermore, the simple design of the slots allows for simple machining which in turn adds very little cost to manufacturing the assembly.

The above description is meant to be exemplary only, and one skilled in the art will recognize that changes may be made to the embodiments described without department from the scope of the invention disclosed. For example, the number of joints attaching the heat shield to the manifold ring can vary as can the location of slowest fuel flow in the manifold ring. Still other modifications which fall within the scope of the present invention will be apparent to those skilled in the art, in light of a review of this disclosure, and such modifications are intended to fall within the appended claims.

The invention claimed is:

1. A fuel manifold assembly for a gas turbine engine comprising an internal fuel manifold and a plurality of fuel nozzles circumferentially distributed about the fuel manifold, the fuel manifold being a continuously uninterrupted annular ring and having at least one fuel conveying passage in fluid flow communication with the plurality of fuel nozzles and defining at least one location susceptible to overheating between two of said fuel nozzles, the location being disposed substantially diametrically opposite from a fuel inlet to the fuel conveying passage of the fuel manifold, and wherein one or more slots extend through the fuel manifold within the susceptible location to reduce heat transfer in the fuel manifold while maintaining the fuel manifold assembly dynamically balanced, each of said one or more slots defining a closed perimeter wholly disposed between inner and outer diameters of the annular internal fuel manifold.

2. The fuel manifold assembly as defined in claim 1, wherein the susceptible location comprising an additional slot on an exposed fuel manifold surface adapted to be exposed to hot air within the gas turbine engine, the additional slot thereby reducing an area of the exposed fuel manifold surface.

3. The fuel manifold assembly as defined in claim 2, wherein the fuel manifold has a lip extending circumferentially about an inner diameter thereof, the additional slot defining a cut-out in the lip.

4. The fuel manifold assembly as defined in claim 3, wherein the additional slot has a substantially smooth inner contour.

5. The fuel manifold assembly as defined in claim 4, wherein the lip extends from a circumferential surface of the fuel manifold and the additional slot extends partially into the circumferential surface.

6. The fuel manifold assembly as defined in claim 1, wherein the fuel manifold defines a radial width extending between the inner and outer diameters, the slot having a width less than said radial width of the manifold.

7. The fuel manifold assembly as defined in claim 6, wherein the slot is located adjacent one of said fuel nozzles such as to reduce convective heat from the susceptible location within the fuel manifold to said one of the fuel nozzles.

8. The fuel manifold assembly as defined in claim 6, wherein the width of the slot is about 60% of the radial width of the fuel manifold.

9. The fuel manifold assembly as defined in claim 1, wherein the slot has a crescent shape.

10. The fuel manifold assembly as defined in claim 9, wherein the fuel manifold defines fuel nozzle receiving ports adapted for engageably receiving the fuel nozzles, and wherein a concave portion of the crescent shaped slot faces one of the fuel nozzle receiving ports.

11. The fuel manifold assembly as defined in claim 10, further comprising a pair of slots each facing respective adjacent fuel nozzle receiving ports located on opposed sides of the susceptible location defined therebetween.

12. A fuel injection system for a gas turbine engine including a compressor, a combustor and a turbine, comprising:

an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold defining at least one location susceptible to overheating between two of the plurality of fuel nozzles, the location being disposed substantially diametrically opposite from the fuel inlet;

an annular heat shield at least partially covering the fuel manifold about the circumference thereof; and at least one slot extending through the fuel manifold in the susceptible location to reduce heat transfer in the fuel manifold while maintaining the fuel manifold assembly dynamically balanced, the at least one slot defining a closed perimeter disposed between inner and outer diameters of the annular internal fuel manifold.

13. The fuel manifold assembly as defined in claim 12, wherein the fuel manifold has a lip extending circumferentially about an inner diameter thereof, an additional slot defining a cut-out in the lip in the susceptible location.

14. The fuel manifold assembly as defined in claim 13, wherein the heat shield is fastened to the lip for mounting to the fuel manifold, the heat shield covering the additional slot during engine operation.

15. The fuel manifold assembly as defined in claim 14, wherein the lip extends from a circumferential surface of the fuel manifold and the additional slot extends partially into the circumferential surface.

16. The fuel manifold assembly as defined in claim 12, wherein the slot is located adjacent one of said fuel nozzles such as to reduce convective heat from the susceptible location within the fuel manifold to said one of the fuel nozzles.

17. The fuel manifold assembly as defined in claim 16, wherein the fuel manifold has an inner and an outer diameter and defines a radial width extending therebetween, the slot being wholly defined within said width.

18. The fuel manifold assembly as defined in claim 17, wherein the slot has a crescent shape.

19. The fuel manifold assembly as defined in claim 18, wherein the fuel manifold defines fuel nozzle receiving ports adapted for engageably receiving the fuel nozzles, and wherein a concave portion of the crescent shaped slot faces one of the fuel nozzle receiving ports.

20. The fuel manifold assembly as defined in claim 19, wherein a pair of said slots are disposed within the susceptible location, said pair of slots being each facing respective adjacent fuel nozzle receiving ports between which the susceptible location is defined.

21. The fuel manifold assembly as defined in claim 12, wherein the susceptible location is a location of one of slow and reduced fuel flow.

22. A method of reducing heat transfer in an annular internal fuel manifold of a fuel injection system in a gas turbine, the method comprising the steps of: determining at least one location of the internal fuel manifold susceptible to overheating during engine operation, the at least one location being disposed substantially diametrically opposite from a fuel inlet to the fuel manifold; forming at least one slot within the susceptible location, the slot defining a closed perimeter disposed between inner and outer diameters of the annular internal fuel manifold; and ensuring that the fuel injection system remains dynamically balanced with said slot formed in the susceptible location of the internal fuel manifold.

* * * * *